United States Patent
Nakamura et al.

(10) Patent No.: US 7,135,062 B2
(45) Date of Patent: Nov. 14, 2006

(54) HYDROPHILIC COLORING MATTER FOR RECORDING IMAGE, AQUEOUS COLORING AGENT FOR RECORDING IMAGE, METHOD AND DEVICE FOR RECORDING IMAGE

(75) Inventors: Michiei Nakamura, Tokyo (JP); Hideyuki Koiso, Tokyo (JP); Naoyuki Sakai, Tokyo (JP); Yoshiyuki Zama, Tokyo (JP); Atsushi Nogami, Tokyo (JP); Hiroyuki Shimanaka, Tokyo (JP); Seishichi Sasaki, Tokyo (JP); Hiroaki Saikatsu, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 7 days.

(21) Appl. No.: 10/522,193

(22) PCT Filed: Jun. 11, 2004

(86) PCT No.: PCT/JP2004/008204

§ 371 (c)(1),
(2), (4) Date: Jan. 24, 2005

(87) PCT Pub. No.: WO2004/111135

PCT Pub. Date: Dec. 23, 2004

(65) Prior Publication Data

US 2005/0235874 A1 Oct. 27, 2005

(30) Foreign Application Priority Data

Jun. 12, 2003 (JP) .............................. 2003-167523

(51) Int. Cl.
*C09B 69/00* (2006.01)
*C09B 5/22* (2006.01)
*C09B 47/16* (2006.01)
*C09B 48/00* (2006.01)
*B41M 5/00* (2006.01)
*C09D 11/00* (2006.01)

(52) U.S. Cl. ............... 106/31.6; 106/31.75; 106/31.76; 106/31.77; 106/31.78; 106/31.79; 106/31.8; 106/31.81; 106/493; 106/495; 106/496; 106/497; 106/498; 106/499; 347/100

(58) Field of Classification Search ................ 106/410, 106/413, 493, 494, 495, 496, 497, 498, 31.6, 106/31.75, 31.77, 31.76, 31.78, 31.79, 31.8, 106/31.81, 499; 347/100
See application file for complete search history.

(56) References Cited

U.S. PATENT DOCUMENTS 5,635,552 A * 6/1997 Endo et al. ................. 524/100

FOREIGN PATENT DOCUMENTS

| JP | 5-222328 | 8/1993 |
|----|----------|--------|
| JP | 2002-275387 | 9/2002 |
| JP | 2002-309118 | 10/2002 |

* cited by examiner

*Primary Examiner*—Anthony J. Green
(74) *Attorney, Agent, or Firm*—Oblon, Spivak, McClelland, Maier & Neustadt, P.C.

(57) ABSTRACT

Image-recording, hydrophilic colorants having an organic pigment linked to a hydrophilic compound through a linking group and which are capable of forming images excellent in print quality such as chroma, gloss, density, light fastness and abrasion fastness, and also as hydrophilic colorants capable of affording inks excellent in physical properties such as long-term storability and press stability are described.

20 Claims, No Drawings

HYDROPHILIC COLORING MATTER FOR RECORDING IMAGE, AQUEOUS COLORING AGENT FOR RECORDING IMAGE, METHOD AND DEVICE FOR RECORDING IMAGE

TECHNICAL FIELD

This invention relates to image-recording, hydrophilic colorants (hereinafter simply called "hydrophilic colorants"), image-recording, water-based coloring compositions (hereinafter simply called "water-based coloring compositions"), and an image-recording method and image-recording systems making use of such hydrophilic colorants or water-based coloring compositions.

BACKGROUND ART

In recent years, inkjet printers (hereinafter simply called "printers") have found wide-spread commercial utility as representative image-recording systems making use of water-based inks (hereinafter simply called "inks") Reflecting the move toward high-quality printers, the use of such printers has expanded to the recording of general documents, the recording of color documents, the preparation of color New Year's cards, the printing of color photographs, the preparation of large drawings, the drafting of large advertisement posters, and the like.

Concerning the users of such printers, on the other hand, they have spread not only to office or business users but also to personal users. Keeping in step with the developments of computer-to-plates in the printing industry field, the use of such printers has also expanded to general printing such as the printing of simple prints and the printing of proof sheets.

DISCLOSURE OF THE INVENTION

Problems to be Solved by the Invention

From the foregoing background, there is an outstanding demand for hydrophilic colorants for inks, which are excellent in print quality such as chroma, gloss, density and abrasion fastness when used to form images on recording media, especially coated paper such as glossy paper and art paper and which are also excellent in physical properties such as long-term storability and press stability when formulated into inks.

The use of an ink with water-soluble dyes contained as colorants therein makes it possible to obtain printed images which are good in chroma, gloss, density and the like shortly after the printing. Used as such water-soluble dyes include direct dyes or acid dyes, which have been conventionally employed to dye cotton and the like or nylon and the like.

These dyes are dissolved in water to dye cotton or nylon, so that each of them contains one or more water-soluble groups such as sulfone groups or carboxyl groups. As auxochromes of the dyes, these sulfone groups or carboxyl groups directly affect chromophores and are equipped with a dyeing function for fibers. From the standpoint of the light fastness of dyed products, however, they are accompanied by a drawback that they significantly lower the light fastness of the dyed products. Similarly, sulfonamido groups of oil-soluble dyes also provide dyed or otherwise colored products with considerably-lowered light fastness.

Concerning inks making use of water dispersions of pigments, on the other hand, there is a move toward incorporating the pigments in finely divided forms in the inks to provide images, which are to be formed with the inks, with improved vividness, brightness, color density and the like. Even with such finely-divided pigments, however, it is still not considered to bring about any sufficient improving effects on the image quality over images available from the use of dye inks.

The present inventors proceeded with extensive research to solve such problems. As a result, it was found that a colorant, in which a hydrophilic compound is linked with a pigment via a linking group, has sufficient solubility in an aqueous medium for an ink and also that the ink with the colorant contained therein can form images pronouncedly improved in light fastness and the like.

To provide colorants capable of forming images excellent in print quality such as chroma, gloss, density, light fastness and abrasion fastness when employed as water-based coloring compositions, especially as inks for printers and also to provide hydrophilic colorants capable of affording inks excellent in physical properties such as long-term storability and press stability, the present inventors have proceed with a further investigation on the basis of the above-described findings. The investigation has now led to the completion of the present invention.

Means for Solving the Problems

Described specifically, the present invention provides a hydrophilic colorant represented by the following formula (1):

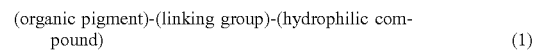

(organic pigment)-(linking group)-(hydrophilic compound)  (1)

wherein said organic pigment is a hydrophobic pigment having no hydrophilic group by itself, said linking group is a group linking said organic pigment and said hydrophilic compound with each other and blocking an effect of said hydrophilic compound on said organic pigment, and said hydrophilic compound is an anionic, cationic and/or non-ionic, hydrophilic compound.

In the above-described hydrophilic colorant according to the present invention, the hydrophobic pigment can be selected preferably from the group consisting of phthalocyanine, anthraquinone, perylene, perinone, dioxazine, quinacridone, diketopyrrolopyrole, indigo• thioindigo, quinophthalone, isoindolinone, metal complex, azo, high-molecular azo, azomethine-containing azo, and azomethine pigments; and/or the linking group can be selected preferably from the group consisting of an alkylene group, s-triazinyl group, s-triazinyl-2,4-diamino group, s-triazinyl-2,4-dioxy group, s-triazinyl-2-amino-4-oxy group, s-triazinyl-2,4-diaminoalkyl group, and s-triazinyl-2-aminoalkyl-4-oxy group.

The present invention also provides a water-based coloring composition comprising the above-described hydrophilic colorant of the present invention and an aqueous medium; an image-recording method, which comprises using the above-described hydrophilic colorant of the present invention or the above-described water-based coloring composition of the present invention; an image-recorded medium obtained by the image-recording method; and an image-recording system comprising the above-described hydrophilic colorant of the present invention or the above-described water-based coloring composition of the present invention loaded as an image-recording material therein. As the recording system, an inkjet printer is preferred.

Advantageous Effects of the Invention

According to the present invention, it is possible to provide colorants capable of forming images excellent in print quality such as chroma, gloss, density, light fastness and abrasion fastness when employed as water-based coloring compositions, especially as inks for printers and also to provide hydrophilic colorants capable of affording inks excellent in physical properties such as long-term storability and press stability.

BEST MODES FOR CARRYING OUT THE INVENTION

Based on certain preferred embodiments, the present invention will hereinafter be described in further detail. The term "organic pigment", which characterizes the present invention, means a hydrophobic pigment containing no hydrophilic group by itself and having a large molecular weight, specifically an organic pigment selected from the group consisting of phthalocyanine, anthraquinone, perylene, perinone, dioxazine, quinacridone, diketopyrrolopyrole, indigo• thioindigo, quinophthalone, isoindolinone, metal complex, azo, high-molecular azo, azomethine-containing azo, and azomethine pigments.

Conventionally, the light fastness of a pigments has been indicated by a rating of from 8 to 1 or by a class of E, VG, G, F or P. Pigments useful in the present invention can be those of Rating 6 or Class G or higher, preferably those of Rating 7 or Class VG or higher, more preferably those of Rating 8 or Class E of higher. The light fastness of a pigment is determined by the molecular structure of the pigment or the crystallinity of the pigment. The present invention uses a pigment, the light fastness of which is considered to be superb based on its molecular structure, to obtain a hydrophilic colorant of the present invention having high light fastness. Pigments preferred in the present invention are, therefore, those which contain one or more substituent groups permitting the introduction of the above-described linking group or groups and have high light fastness.

Examples of the above-described preferred pigments include, as phthalocyanine pigments, copper phthalocyanine blue (C.I. Pigment Blue 15), aluminum phthalocyanine blue, metal-free phthalocyanine blue (C.I. Pigment Blue 16), partially-brominated copper phthalocyanine green, partially-chlorinated copper phthalocyanine green, and the like.

As anthraquinone pigments, phthalolylamide yellow (C.I. Pigment Yellow 123), flavanthrone (C.I. Pigment Yellow 24), anthrapyrimidine yellow (C.I. Pigment Yellow 108), C.I. Vat Yellow 48, pyranthrone orange (C.I. Pigment Orange 40), C.I. Pigment Red 177, dibromoanthoanthrone (C.I. Pigment Red 168), indanthrone blue (C.I. Pigment Blue 60) and the like can be mentioned.

As perylene pigments, perylene red 189 (C.I. Pigment Red 189), perylene red 190 (C.I. Pigment Red 190), C.I. Pigment Red 149 and the like can be mentioned. As perinone pigments, perinone orange (C.I. Pigment Orange 43), perinone red (C.I. Pigment Red 194) and the like can be mentioned.

As dioxazine pigments, dioxazine violet (C.I. Pigment Violet 23) and the like can be mentioned, and as quinacridone pigments, quinacridone red (C.I. Pigment Violet 19), quinacridone magenta (C.I. Pigment Red 122), dichloroquinacridone (C.I. Pigment Red 209) and the like can be mentioned.

As diketopyrrolopyrole pigments, diketopyrrolopyrole reds (C.I. Pigment Red 254 and 255) and the like can be mentioned, and as indigo•thioindigo pigments, thioindigo red (C.I. Pigment Red 87), thioindigo magenta (C.I. Pigment Red 87), dichlorodimethylthioindigo (C.I. Pigment Violet 36) and the like can be mentioned.

As quinophthalone pigments, quinophthalone yellow (C.I. Pigment Yellow 138) and the like can be mentioned, and as isoindolinone pigments, isoindolinone yellow (C.I. Pigment Yellow 139), C.I. Pigment Yellow 109 and the like can be mentioned.

As metal complex pigments, nickel nitroso yellow (C.I. Pigment Yellow 153) and the like can be mentioned. Further, colorants having similar chemical formulas to the above-described various higher pigments can be mentioned.

The term "linking group" as used herein means a group having functions that a hydrophilic compound is linked to the above-described pigment and each water-soluble group, such as a sulfone or carboxyl group, in the hydrophilic compound is blocked from affecting the pigment such that the hue or light fastness of the pigment is altered or lowered due to a change in pH. The linking group can be selected, for example, from an alkylene group (preferably of 1 to 30 carbon atoms), s-triazinyl group, s-triazinyl-2,4-diamino group, s-triazinyl-2,4-dioxy group, s-triazinyl-2-amino-4-oxy group, s-triazinyl-2,4-diaminoalkyl group, s-triazinyl-2-aminoalkyl-4-oxy group, or the like.

The term "hydrophilic compound" as used herein means a conventionally-known compound having one or more anionic, cationic and/or nonionic, hydrophilic groups. Illustrative are compounds having one or more anionic groups such as carboxyl, sulfone, sulfate ester or phosphate ester groups; one or more cationic groups such as primary to tertiary amino or quaternary ammonium groups; one or more nonionic groups such as alcoholic hydroxyl, polyethylene glycol or polyethylene glycol monoalkyl ether groups; or one or more anionic•nonionic groups such as polyethylene glycol monophthalate, polyethylene glycol monosulfate or polyethylene glycol monophosphate.

As illustrative groups of the above-described hydrophilic compounds each of which can be introduced into the pigment via the linking group, groups of the following compounds can be mentioned.

(1) Groups of hydrophilic compounds the linking groups of which are alkylene groups:

The disodium salt of a trimellitic acid monoamidomethylene group, the monosodium salt of a phthalic monoamidomethylene group, the sodium salt of a carboxymethylaminomethylene group, the disodium salt of a di(carboxymethyl)aminomethylene group, the disodium salt of a (glutalic acid)-1-iminomethylene group derived from glutamic acid, the disodium salt of a (succinic acid)-1-iminomethylene group derived from aspartic acid, the disodium salt of a trimellitic acid monoamidoethylene group, the monosodium salt of a phthalic acid monoamidoethylene group, the disodium salt of a trimellitic acid monoamidoproylene group, the monosodium salt of a phthalic acid monoamidopropylene group, the disodium salt of a sulfosuccinic acid monoamidomethylene group, the disodium of a sulfophthalic acid monoamidomethylene group, the monosodium salt of a trimellitic acid (methoxypolyethylene glycol monoester) monoamidomethylene group, and the like.

(2) Groups of hydrophilic compounds the linking groups of which are s-triazinyl groups:

The tetrasodium salt of a 4,6-bis(3',4'-dicarboxyphenylenamino)-s-triazinyl-2-amino group, the disodium salt of a 4,6-bis(4'-carboxyphenylamino)-s-triazinyl-2-amino group, the disodium salt of a 4,6-bis(carboxymethylamino)-s-triazinyl-2-amino group, the tetrasodium salt of a 4,6-bis[di(caboxymethyl)amino]-s-triazinyl-2-amino group, the disodium salt of a 4,6-bis(propionic acid-1-amino)-s-triazinyl-2-amino group, the tetrasodium salt of a 4,6-bis(glutalic acid-1-amino)-s-triazinyl-2-amino group, the tetrasodium salt of a 4,6-bis(succinic acid-1-amino)-s-triazinyl-2-amino group, the disodium salt of a 4,6-bis (sulfoethylamino)-s-triazinyl-2-amino group, the disodium salt of a 4,6-bis(N-methyl-sulfoethylamino)-s-triazinyl-2-amino group, a 4,6-bis(polyoxyethylenamino)-s-triazinyl-2-amino group, the tetrasodium salt of a 4,6-bis(3',4'-dicarboxyphenylenamino)-s-triazinyl-2-oxy group, the disodium salt of a 4,6-bis(carboxymethylamino)-s-triazinyl-2-oxy group, the tetrasodium salt of a 4,6-bis(3',4'-dicarboxyphenylenamino)-s-triazinyl-2-aminoethyl group, the tetrasodium salt of a 4,6-bis[di(carboxymethyl)amino]-s-triazinyl-2-aminomethyl group, and the like.

The following processes can be mentioned as illustrative processes for the synthesis of the hydrophilic colorant in the present invention.

(1) A process comprising reacting a polyfunctional, reactive compound, which can form a linking group, with a pigment or a derivative thereof; reacting a hydrophilic compound (or a precursor of the hydrophilic compound, said precursor containing a latent hydrophilic group) which is reactive with the reaction product; and in the case of the precursor, converting the latent hydrophilic group into a hydrophilic group;

(2) A process comprising reacting a hydrophilic compound or a precursor thereof with a polyfunctional, reactive compound which can form a linking group; and then reacting the resulting reaction compound with a pigment or a derivative thereof; and (3) A process comprising reacting a hydrophilic compound or a precursor thereof with a pigment intermediate or a derivative thereof via a polyfunctional compound capable of forming a linking group; and using the resulting reaction compound to obtain a pigment.

Further, examples of the above-described individual production processes will be described specifically.

The Process (1)

For example, cyanuric chloride is reacted beforehand with 2 molar equivalents of iminodiacetic acid and 1 molar equivalent of ammonia to synthesize 2-amino-4,6-bis(dicarboxymethylamino)-s-triazine. A copper phthalocyanine blue pigment is dissolved in concentrated sulfuric acid, and paraformaldehyde is reacted to synthesize a methylol-substituted product. The 2-amino-2-amino-4,6-bis(dicarboxymethylamino)-s-triazine which has been obtained in the above is then reacted to synthesize 4',6'-bis(dicarboxymethylamino)-s-triazinylaminomethyl copper phthalocyanine. The carboxyl groups are then neutralized with an aqueous solution of sodium hydroxide to obtain 4',6'-bis(dicarboxymethylamino)-s-triazinylaminomethyl copper phthalocyanine sodium. In the above-described hydrophilic colorant, the s-triazinylaminomethyl group is a linking group and has a function to link the sodium carboxylate group, in which a carboxymethylamino group is a hydrophilic group, such that the pigment is solubilized. The number of 4',6'-bis(dicarboxymethylamino)-s-triazinylaminomethyl group(s) can be changed depending upon the molar ratio to be reacted. In the case of a copper phthalocyanine, the solubilization of a hydrophilic colorant derived from the copper phthalocyanine requires about 3 to 4 or more substituent groups of the sodium carboxylate on average per molecule of the hydrophilic colorant. With respect to other pigments, hydrophilic colorants according to the present invention can also be synthesized by reacting them in a similar manner as described above.

The Process (2)

For example, formaldehyde is reacted with trimellitamide to synthesize a methylol-substituted product. A copper phthalocyanine blue pigment is dissolved in concentrated sulfuric acid, and is reacted with the methylol-substituted product of trimellitamide to synthesize trimellitimidomethyl copper phthalocyanine. The imido group was then hydrolyzed with an aqueous solution of sodium hydroxide to afford trimellitamidomethyl copper phthalocyanine sodium. In the above-described hydrophilic colorant, the methylene group forms a linking group, and the trimellitamido (dicarboxybenzamido) group links the sodium carboxylate group as a hydrophilic group to solubilize the pigment. The number of trimellitamidomethylene group(s) can be changed depending upon the molar number of the raw material to be reacted. Examples of the latent hydrophilic group in the precursor having the latent hydrophilic group include lower alkyl(C1–3) carboxylate groups and carboxylamido groups. With respect to other pigments, hydrophilic colorants can also be synthesized by reacting them in a similar manner as described above.

As an alternative synthesis process, cyanuric chloride is reacted with 2 molar equivalents of iminodiacetic acid (or its dimethyl ester) to synthesize 2-chloro-4,6-bis(dicarboxymethylamino)-s-triazine (or its dimethyl ester). The chlorine in the resulting triazine derivative is reacted with an amino group in an amino-containing pigment, for example, the amino group in Pigment Red 177 to afford a hydrophilic colorant of a red color. Further, the chloride is reacted with the imino groups in perylenetetracarboxylic bis(aminophenylimide) (and in the case of the dimethyl ester, then hydrolyzed) to obtain a hydrophilic colorant of a red color. In the above-described hydrophilic colorant, the s-triazinylamino group acts as a linking group and links the sodium carboxylate group.

The Process (3)

For example, 2,4-bis(dicarboxymethylamino)-6-(amino)phenylamino-s-triazine is reacted with perylenetetracarboxylic acid anhydride to obtain a hydrophilic colorant of a red color. Further, 2',4'-bis(dibutoxycarbonylamino)-s-triazinyl-6'-(4-amino)phthalodinitrile and phthalodinitrile are reacted at a molar ratio of 2:2 together with copper chloride in accordance with the phthalodinitrile process to afford a copper phthalocyanine derivative. The derivative is subjected to alkali hydrolysis to obtain the sodium salt of 2',4'-bis(dicarboxymethylamino)-s-triazinyl-6'-(4-amino) copper phthalocyanine. In the above-described hydrophilic colorant, the s-triazinylamino group acts as a linking group to link the sodium carboxylate group.

As particularly preferred hydrophilic colorants in the present invention, colorants represented by the following formula (2) or (3) can be mentioned.

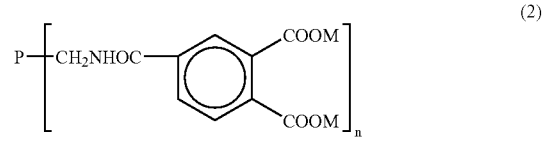

(2)

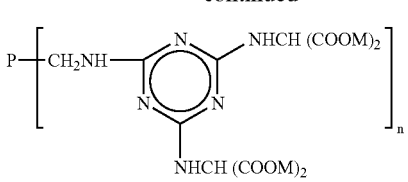

wherein P represents an organic pigment molecule, M represents a hydrogen atom, alkali metal, ammonium group, (lower alkyl)ammonium group or (lower alkanol)ammonium group, and n stands for 1 to 4. Examples of the above-described pigment include a copper phthalocyanine pigment (C.I. Pigment Blue 15), a quinacridone pigment (C.I. Pigment Violet 19), a flavanthrone pigment (C.I. Pigment Yellow 24), and the like.

The water-based coloring composition according to the present invention is characterized in that it comprises the above-described hydrophilic colorant of the present invention and an aqueous medium. Suitable examples of the water-based coloring composition are inks for ink-jet printing. In terms of hues, such inks include 3-color inks consisting of cyan, magenta and yellow, 5-color inks added further with sky blue and pink colors, 6-color inks obtained by adding orange, green and violet color inks to the 3-color inks, and ink combinations with a black ink added further to such inks. These inks each contains one or more of the above-described hydrophilic colorants as colorants.

The ink according to the present invention contains the hydrophilic colorant at a content sufficient to fully provide printed images with satisfactory print quality such as color density, chroma and gloss and also to provide the printed images with satisfy dryability and fastness such as abrasion fastness. In addition, this content should also be sufficient to provide the ink with satisfactory viscosity and storage stability. From these requirements, the content of the hydrophilic colorant can be from 0.5 to 20 wt. %, preferably from 1 to 10 wt. %.

To make further improvements in physical properties of the resulting ink such as abrasion fastness and also in print quality such as print definition and gloss, a hydrophilic polymer may be incorporated in the ink according to the present invention as needed. Preferred as such a hydrophilic polymer can be a conventionally-known, alkali-soluble polymer which has been used in inks for years. This preferred, alkali-soluble polymer acts not only as a dissolution aid for the hydrophilic colorant in the ink but also as a binder for the hydrophilic colorant. No particular limitation is imposed on such a hydrophilic polymer insofar as it is a polymer soluble in an aqueous solution of an alkali. However, use of a polymer the weight average molecular weight of which is 50,000 or lower, preferably 40,000 or lower is preferred from the standpoint of the dissolution stability of the hydrophilic colorant in the ink.

As the hydrophilic polymer, a hydrophilic random copolymer, hydrophilic graft copolymer, hydrophilic block copolymer or the like, which is composed of a hydrophilic monomer and a hydrophobic monomer, can be mentioned. Examples of the hydrophilic monomer include α,β-ethylenically-unsaturated carboxylic acids such as (meth)acrylic acid and crotonic acid, and their ethylene glycol esters, polyethylene glycol esters, alkoxypolyethylene glycols, and the like; unsaturated dibasic acids such as maleic acid, fumaric acid and itaconic acid, and their half alkyl(C1–8) esters, half amides, di(ethylene glycol monoesters), di(polyethylene glycol monoesters), di(alkoxypolyethylene glycol esters), and the like; styrenesulfonic acid; and vinyl sulfonic acid. Examples of the hydrophobic monomer, on the other hand, include styrene, and styrene derivatives such as α-methylstyrene; vinylnaphthalene derivatives; aliphatic, alicyclic or aromatic alcohol esters of α,β-ethylenically-unsaturated carboxylic acids, such as aliphatic, alicyclic or aromatic alcohol(C1–C30) esters and alkoxy(C1–C4) or alkyl (C2–C4) esters of (meth)acrylic acid; aliphatic, alicyclic or aromatic alcohol(C1–C30) diesters of unsaturated dibasic acids such as maleic acid, fumaric acid and itaconic acid; and vinyl acetate, butadiene, isoprene, ethylene, propylene, and butylene.

In the above-described hydrophilic polymer, one or more comonomers can also be used as desired. Illustrative are (meth)acrylonitrile, (meth)acrylamide, N-methylol (meth) acrylamide, and diacetone acrylamide. The content of the hydrophilic polymer in the ink may be preferably from 5 to 100 wt. %, more preferably from 8 to 50 wt. % based on the content of the hydrophilic colorant. An alkali is used to solubilize such a hydrophilic polymer in an aqueous medium. Although no particular limitation is imposed on the alkali, a preferred alkali can be, for example, a compound selected from the group consisting of ammonia, primary, secondary and tertiary organic amines (including basic, nitrogen-containing, heterocyclic compounds), and alkali metal hydroxides such as sodium hydroxide and potassium hydroxide.

An aqueous medium suitable for use in the ink according to the present invention is water or a mixed solvent of water and a water-soluble organic solvent. As the water, use of deionized water is preferred. The content of water in the ink is generally in a range of from 10 to 70 wt. %, with a range of from 20 to 50 wt. % being preferred. A water-soluble organic solvent can also be used for its function to prevent the ink from drying and also to promote the dissolution of the colorant. Illustrative are alkylene polyols in each of which the alkylene group contains 2 to 6 carbon atoms, such as ethylene glycol, propylene glycol, butylene glycol, thiodiglycol, hexylene glycol, diethylene glycol, triethylene glycol, 1,2,6-hexanetriol and glycerin; lower alkyl ethers of polyhydric alcohols, such as ethylene glycol monoalkyl (C1–C4) ethers, diethylene glycol alkyl (C1–C4) ethers) and triethylene glycol monoalkyl (C1–C4) ethers; N-methyl-2-pyrrolidone; 2-pyrrolidone; and 1,3-dimethyl-2-imidazolidinone. To control the drying characteristics of the ink or to improve the solubility of a material to be added such as a hydrophilic polymer, an alkyl alcohol having 1 to 4 carbon atoms, such as n-propyl alcohol, isopropyl alcohol, n-butyl alcohol, sec-butyl alcohol or tert-butyl alcohol, can also be added to the ink as needed. To provide an ink having desired physical properties, one or more of other components such as surfactants, defoaming agents and preservatives can also be added to the ink of the present invention as needed. In addition, urea, thiourea or ethylene urea or a derivative thereof can also be incorporated as a drying preventive for the ink at nozzles.

Any dissolution apparatus can be used to dissolve the hydrophilic colorant in the aqueous medium in the present invention, insofar as it is a commonly-employed dissolution apparatus. Dissolution can be effected, for example, in a conventionally-known dissolution apparatus such as a dissolution tank equipped with an agitator and permitting heating and cooling or a reactor equipped with an agitator and condenser. Subsequent to the dissolution, it is also possible to perform a step such as the removal of undissolved components by a filter, a centrifugator or the like.

The hydrophilic colorant according to the present invention can also be used in the form of an admixture with a water dispersion of fine particles of a pigment or a sulfonated pigment, said fine particles or sulfonated pigment having been conventionally used as a colorant for inks, especially with a sulfonated, carbon black pigment (see JP-A-2003-165926). In combination with one or more inks containing the above-described conventional colorants, one or more inks with hydrophilic colorants of the present invention contained therein can be used as an ink of a single color or inks of plural colors in 4-color to 7-color inks to provide a set of inks.

The ink according to the present invention is excellent in color development properties such as color density and chroma and also superb in print quality, and is suited especially for inkjet recording that performs recording by causing ink droplets to fly from a printer head. The hydrophilic colorant according to the present invention, on the other hand, is suited as a wet developer for wet electroprinting, a colorant for printing inks such as water-based gravure inks and water-based flexographic inks, a colorant for paper, a colorant in textile printing agents for woven fabrics, and the like.

EXAMPLES

Based on specific examples and comparative examples, the present invention will next be described in further detail. It is, however, to be noted that all the designations of "part", "parts" and "%" in the following description are on a weight basis unless otherwise specifically indicated.

Example 1

(a) Preparation of Hydrophilic Colorant Solutions

Trimellitimide was dissolved in concentrated sulfuric acid, followed by the reaction with 1.2 molar equivalents of paraformaldehyde to synthesize a methylol-substituted product. A copper phthalocyanine blue pigment (C.I. Pigment Blue 15) was added to and dissolved in the reaction mixture to react it with the methylol-substituted product of trimellitimide. The reaction mixture was poured into a large amount of ice water to have the reaction product precipitated. The reaction product was collected by filtration, and was then washed to obtain trimellitimidomethyl copper phthalocyanine. Following a conventional procedure, an aqueous solution of sodium hydroxide was added to conduct a hydrolytic reaction, and thereafter, undissolved matter was filtered out. The resulting, blue aqueous solution of trimellitamidomethyl copper phthalocyanine sodium was added to dilute acetic acid to acidify the solution such that reprecipitation was induced. The precipitate was washed with water and then dried to afford the trimellit(monoamido)methyl derivative of copper phthalocyanine. The degree of substitution was approximately 2.5 (hereinafter called "the blue pigment derivative-1").

The trimellit(monoamido)methyl derivative of quinacridone (hereinafter called "the red pigment derivative-1") was also obtained in a similar manner except that a quinacridone pigment (C.I. Pigment Violet 19) was reacted in place of the copper phthalocyanine blue pigment.

The trimellit(monoamido)methyl derivative of flavanthrone (hereinafter called "the yellow pigment derivative-1") was also obtained in a similar manner except that a flavanthrone pigment (C.I. Pigment Yellow 24) was reacted.

(b) Preparation of Printer Inks

A dried product (10 parts) of the blue pigment derivative-1 was taken, and then added to an aqueous alkali solution (80 parts) which contained substantially the equivalent amount of sodium hydroxide, and the resultant mixture was stirred. While paying attention to the pH, an aqueous alkali solution was added, followed by stirring for 1 hour to dissolve the blue pigment derivative-1. Subsequent to the dissolution, the pH was adjusted to from 8.0 to 8.5. The resulting mixture was subjected to centrifugation to adjust the concentration of the blue pigment derivative-1 to 10%. To the thus-obtained 10% aqueous solution of the colorant (60 parts), a mixture (40 parts) consisting of ethylene glycol (10 parts), glycerin (20 parts), "SURFYNOL 82" (product of Air Products and Chemicals, Inc.) (1 part) and water (9 parts) was added. After thorough stirring, the mixture was filtered through a membrane filter of 5 μm pore size to obtain a cyan ink for printers.

A magenta ink for printers and a yellow ink for printers were also prepared in a similar manner except that in place of the blue pigment derivative-1, the red pigment derivative-1 and the yellow pigment derivative-1 were used to prepare a 10% aqueous solution of the magenta colorant and a 10% aqueous solution of the yellow colorant, respectively.

(c) Ranking of the Printer Inks

Each of the inks obtained in the above-described procedure (b) were ranked as will be described hereinafter. The ink was filled in an ink cartridge, and by a printer, solid printing was performed on glossy inkjet paper, "PHOTOLIKE QP" (product of KONICA CORPORATION). After the print was left over for 1 day in a room, its optical density was measured using "MACBETH RD-914" (manufactured by Macbeth AG), its chroma was measured using a chromatic meter ("CR-321", manufactured by Minolta Camera Co., Ltd.), and its 60-deg. gloss was measured using "MICRO-TRI-GLOSS" (manufactured by BYK-Chemie GmbH). Further, vertical and horizontal lines were printed. The resultant print was visually observed for print definition to rank its print quality. To perform ranking in light fastness, the print was exposed to ultraviolet rays at an irradiation intensity of 60 mW/cm$^2$ and a temperature of 63° C. for 15 hours in an accelerated light-fastness tester ("I-SUPER UV TESTER", manufactured by Iwasaki Electric Co., Ltd.). The optical density and chroma of the print were measured both before and after the test. The results are shown in Table 1.

TABLE 1

| Inks of Example 1 | | | Cyan | Magenta | Yellow |
|---|---|---|---|---|---|
| Quality of printed image | Print quality | Optical density | 2.55 | 1.92 | 2.04 |
| | | Chroma | 60.8 | 76.2 | 90.5 |
| | | Print definition | A | A | A |
| | | 60-Deg. gloss | 99 | 105 | 103 |
| | Light fastness | Optical density Before test | 2.55 | 1.92 | 2.04 |
| | | After test | 2.50 | 1.33 | 1.85 |
| | | Chroma Before test | 60.8 | 76.2 | 90.5 |
| | | After test | 55.4 | 56.4 | 70.6 |

Ranking in print definition -
A: No misalignment,
B: Substantially no misalignment,
C: Misaligned.

Comparative Example 1

Using commercial dye inks, their ranking was performed in a similar manner as in Example 1(c). The results are shown in Table 2.

TABLE 2

| Inks of Comparative Example 1 | | | Cyan | Magenta | Yellow |
|---|---|---|---|---|---|
| Quality of printed image | Print quality | Optical density | 2.51 | 2.06 | 2.24 |
| | | Chroma | 55.3 | 83.4 | 118 |
| | | Print definition | A | A | A |
| | | 60-Deg. gloss | 45 | 52 | 53 |
| | Light fastness | Optical density Before test | 2.51 | 2.06 | 2.24 |
| | | Optical density After test | 2.29 | 0.21 | 0.90 |
| | | Chroma Before test | 55.3 | 83.4 | 118 |
| | | Chroma After test | 49.4 | 12.8 | 62.2 |

Ranking in print definition -
A: No misalignment,
B: Substantially no misalignment,
C: Misaligned.

As evident from Tables 1 and 2, the inks according to the present invention were equivalent to the commercial dye inks in print quality such as optical density, chroma and print definition, and were far superior to the dye inks in the gloss and light fastness of prints.

Example 2

(a) Preparation of Hydrophilic Colorant Solutions

The copper phthalocyanine blue pigment was dissolved in concentrated sulfuric acid, followed by the reaction with 2 molar equivalents of paraformaldehyde to synthesize a methylol-substituted product. 2-Amino-4,6-bis(dicarboxymethylamino)-s-triazine was then reacted to synthesize 4',6'-bis(dicarboxymethylamino)-s-triazinylaminomethyl copper phthalocyanine. The carboxyl groups were neutralized with an aqueous solution of sodium hydroxide to effect dissolution. Undissolved matter was filtered out. The resulting, blue aqueous solution of 4',6'-bis(dicarboxymethylamino)-s-triazinylaminomethyl copper phthalocyanine sodium was added to dilute acetic acid to acidify the solution such that the colorant was caused to reprecipitate. The precipitate was washed with water and then dried to afford 4',6'-bis(dicarboxymethylamino)-s-triazinylaminomethyl copper phthalocyanine. The degree of substitution was approximately 1.5 (hereinafter called "the blue pigment derivative-2").

The 4',6'-bis(dicarboxymethylamino)-s-triazinylaminomethyl derivative of quinacridone (hereinafter called "the red pigment derivative-2") was also obtained in a similar manner except that a quinacridone pigment (C.I. Pigment Violet 19) was reacted in place of the copper phthalocyanine blue pigment. The 4',6'-bis(dicarboxymethylamino)-s-triazinylaminomethyl derivative of flavanthrone (hereinafter called "the yellow pigment derivative-2") was also obtained in a similar manner except that a flavanthrone pigment (C.I. Pigment Yellow 24) was reacted.

(b) Preparation of Printer Inks

A dried product (20 parts) of the blue pigment derivative-2 was added to an aqueous alkali solution (80 parts) which contained substantially the equivalent amount of sodium hydroxide, and the resultant mixture was stirred. While paying attention to the pH, an aqueous alkali solution was added, followed by stirring for 1 hour to effect dissolution. Subsequent to the dissolution, the pH was adjusted to from 8.0 to 8.5. The resulting mixture was subjected to centrifugation to adjust the concentration to 15%. To the thus-obtained 15% aqueous solution of the colorant (60 parts), a mixture (40 parts) consisting of ethylene glycol (10 parts), glycerin (20 parts), "SURFYNOL 82" (product of Air Products and Chemicals, Inc.) (1 part) and water (9 parts) was added. After thorough stirring, the mixture was filtered through a membrane filter of 5 μm pore size to obtain a cyan ink for printers.

A magenta ink for printers and a yellow ink for printers were also prepared in a similar manner except that in place of the blue pigment derivative-2, the red pigment derivative-2 and the yellow pigment derivative-2 were used to prepare a 15% aqueous solution of the magenta colorant and a 15% aqueous solution of the yellow colorant, respectively.

(c) Ranking of the Printer Inks

Each of the inks obtained in the above-described procedure (c) was ranked by the methods described in Example 1. The results are shown in Table 3.

TABLE 3

| Inks of Example 2 | | | Cyan | Magenta | Yellow |
|---|---|---|---|---|---|
| Quality of printed image | Print quality | Optical density | 2.23 | 2.03 | 2.16 |
| | | Chroma | 62.5 | 80.4 | 92.4 |
| | | Print definition | A | A | A |
| | | 60-Deg. gloss | 100 | 99 | 96 |
| | Light fastness | Optical density Before test | 2.23 | 2.03 | 2.16 |
| | | Optical density After test | 1.90 | 1.70 | 1.86 |
| | | Chroma Before test | 62.5 | 80.4 | 92.4 |
| | | Chroma After test | 55.4 | 50.2 | 68.3 |

Ranking in print definition -
A: No misalignment,
B: Substantially no misalignment,
C: Misaligned.

As evident from Table 3, the inks according to the present invention were equivalent to the commercial dye inks in print quality such as optical density, chroma and print definition, and were far superior to the dye inks in the gloss and light fastness of prints.

INDUSTRIAL APPLICABILITY

According to the present invention, it is possible to provide colorants capable of forming images excellent in print quality such as chroma, gloss, density, light fastness and abrasion fastness when employed as water-based coloring compositions, especially as inks for printers and also to provide hydrophilic colorants capable of affording inks excellent in physical properties such as long-term storability and press stability.

The invention claimed is:

1. An image-recording, hydrophilic colorant represented by the following formula (1):

(organic pigment)-(linking group)-(hydrophilic compound)     (1)

wherein
the organic pigment is a hydrophobic pigment selected from the group consisting of perinone, dioxazine, quinacridone, diketopyrrolopyrole, quinophthalone, isoindolinone, and metal complex;
the linking group is selected from the group consisting of an alkylene group. s-triazinyl group. s-triazinyl-2.4-diamino group. s-triazinyl-2.4-dioxy group. s-triazinyl-2-amino-4-oxy group, s-triazinyl-2.4-diaminoalkyl group, and s-triazinyl-2-aminoalkyl-4-oxy group; and
the hydrophilic compound comprises one or more carboxyl groups, sulfone groups, sulfate ester groups, phosphate ester groups, primary amino groups, primary quaternary ammonium groups, secondary amino groups, secondary quaternary ammonium groups, tertiary amino groups, tertiary quaternary ammonium groups; alcoholic hydroxyl groups, polyethylene glycol grouos, polyethylene glycol monoalkyl ether groups; polyethylene glycol, monophthalate, polyethylene glycol monosulfate or polyethylene glycol monophosphate 2. An image-recording, water-based coloring composition comprising the hydrophilic colorant according to claim 1 and an aqueous medium.

3. An image-recording method, comprising forming an image with a composition, which comprises the hydrophilic colorant according to claim 1.

4. An image-recorded medium obtained by the image-recording method according to claim 3.

5. An image-recording system comprising the hydrophilic colorant according to claim 1 loaded as an image-recording material therein.

6. An image-recording system according to claim 5, which is an inkjet printer.

7. An image-recording method, comprising forming an image with a composition, which comprises the water-based coloring composition according to claim 2.

8. An image-recorded medium obtained by the image-recording method according to claim 7.

9. An image-recording system comprising the water-based coloring composition according to claim 2, loaded as an image-recording material therein.

10. An image-recording system according to claim 9, which is an inkjet printer.

11. A hydrophilic colorant which is represented by the following formula (2):

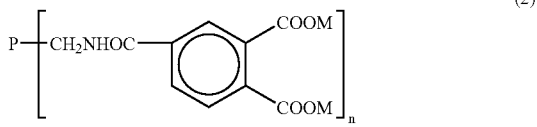

(2)

wherein P represents an organic pigment molecule, M represents a hydrogen atom, alkali metal, ammonium group, (lower alkyl)ammonium group or (lower alkanol)ammonium group, and n stands for 1 to 4.

12. An image-recording, water-based coloring composition comprising the hydrophilic colorant according to claim 11 and an aqueous medium.

13. An image-recording method, comprising forming an image with a composition, which comprises the hydrophilic colorant according to claim 11.

14. An image-recorded medium obtained by the image-recording method according to claim 13.

15. An image-recording system comprising the hydrophilic colorant according to claim 11 loaded as an image-recording material therein.

16. A hydrophilic colorant, which is represented by the following formula (3):

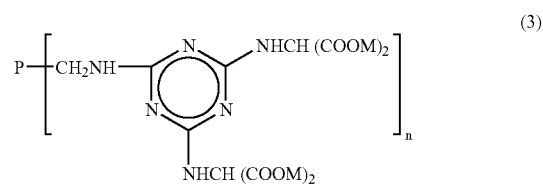

(3)

wherein P represents an organic pigment molecule, M represents a hydrogen atom, alkali metal, ammonium group, (lower alkyl)ammonium group or (lower alkanol)ammonium group, and n stands for 1 to 4.

17. An image-recording, water-based coloring composition comprising the hydrophilic colorant according to claim 16 and an aqueous medium.

18. An image-recording method, comprising forming an image with a composition, which comprises the hydrophilic colorant according to claim 16.

19. An image-recorded medium obtained by the image-recording method according to claim 18.

20. An image-recording system comprising the hydrophilic colorant according to claim 16 loaded as an image-recording material therein.

* * * * *